UNITED STATES PATENT OFFICE.

COLIN PAGET MATTHEWS, OF GRANTHAM, ENGLAND.

IMPROVEMENT IN COMPOSITIONS FOR COATING ALE-CASKS, &c.

Specification forming part of Letters Patent No. 118,738, dated September 5, 1871.

*To all whom it may concern:*

Be it known that I, COLIN PAGET MATTHEWS, of Grantham, in the county of Lincoln, England, brewer, have invented an improved compound or preparation to be applied to the insides of casks and other vessels, and an improvement in the mode of applying such and other preparations, of which the following is a specification:

The invention has for its object the manufacture of an improved compound or preparation to be applied to the insides of casks and other vessels, and an improvement in the mode of applying such and other preparations whereby the vessels are rendered thoroughly air and water-tight and prevented becoming moldy, while they are more readily cleansed and are better adapted for keeping ales and other liquids in a sound condition.

For this purpose I take about one hundred and eight quarts of spirits of wine, to which I add about one hundred and eight pounds of shellac, and when the shellac is thoroughly dissolved I add about sixty pounds of powdered charcoal to the solution. This mixture is well roused or stirred when using it.

I prefer for the above purpose to employ only the outer portion of the charcoal, and not the heart or core, reduced to fine powder, and I employ the best liver or orange shellac on account of its being tasteless, and thereby communicating no flavor or taste to the contents of the vessel. I find it is better to keep the preparation a month or so before using it; but if desired, it may be used immediately after its preparation.

The mode in which I apply this preparation to casks is as follows: After thoroughly drying a cask or other vessel, I immediately, apply with a paint-brush, a coating of the preparation to the inside thereof and let it stand until the next day, when another coat should be put on in the same manner and a light applied so as to flame off the spirit, which thereby causes the preparation to be more thoroughly distributed and united to the surface of the vessel. The cask or other vessel, after being washed with hot water, will then be ready for use.

Instead of using spirits of wine, as before described, "methylated finish" or other suitable spirit may be employed, and the proportions of the various ingredients may be modified without departing from the nature of my invention.

I would here remark that I am aware that shellac dissolved in spirit has before been employed as a varnish or coating for various articles. I therefore do not claim such mixture or preparation as my invention. I am also aware that tarry and some other substances have been added to such shellac solution to give more body to the compound; but my composition, when applied in the manner I have described, will be found to combine in a superior degree the qualities of tastelessness, imperishability, elasticity, tenacity, and impermeability.

What I do claim is—

1. The manufacture of a compound or preparation consisting of shellac dissolved in any suitable spirit and mixed with powdered charcoal, in manner and for the purpose substantially as herein described.

2. The improvement herein described in applying the above preparation or other similar preparations containing spirits by flaming it off, as herein described.

COLIN P. MATTHEWS.

Witnesses:
 FRED. MARRIOTT,
 WM. WHITTLEY. (58.)